(12) United States Patent
Clark et al.

(10) Patent No.: US 6,910,370 B2
(45) Date of Patent: Jun. 28, 2005

(54) APPARATUS AND METHOD FOR PREVENTING INLET VORTEX

(75) Inventors: Terry A. Clark, East Hartford, CT (US); Justin R. Urban, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 10/063,900

(22) Filed: May 22, 2002

(65) Prior Publication Data

US 2003/0217593 A1 Nov. 27, 2003

(51) Int. Cl.[7] .............................................. G01M 15/00
(52) U.S. Cl. ........................................................ 73/116
(58) Field of Search ............................... 73/116, 23.31, 73/147, 117.4, 170.11, 53.01; 60/204, 778; 702/104; 244/2; 415/1

(56) References Cited

U.S. PATENT DOCUMENTS

| | | | | |
|---|---|---|---|---|
| 5,293,775 A | | 3/1994 | Clark et al. | |
| 5,340,055 A | * | 8/1994 | Rodyniuk et al. | 244/1 R |
| 5,377,534 A | * | 1/1995 | Boet | 73/116 |
| 5,591,904 A | * | 1/1997 | Schafhaupt et al. | 73/117.4 |
| 5,823,468 A | * | 10/1998 | Bothe | 244/2 |
| 6,016,888 A | * | 1/2000 | Lynn | 181/218 |
| 6,162,011 A | * | 12/2000 | Gerhardt et al. | 415/1 |
| 6,497,137 B2 | * | 12/2002 | Helgeson | 73/23.31 |

* cited by examiner

Primary Examiner—Edward Lefkowitz
Assistant Examiner—Octavia Davis
(74) Attorney, Agent, or Firm—Brian J. Hamilla

(57) ABSTRACT

A method of operating a gas turbine engine for testing, comprising: providing an aircraft on a tarmac, the aircraft having a gas turbine engine with an inlet; selecting a power setting for the engine that is capable of producing a vortex between the inlet and the tarmac; and inhibiting formation of the vortex. A suppressor for preventing a vortex between an inlet of a gas turbine engine on an aircraft and a tarmac. The suppressor comprises: a base facing the tarmac; and an inclined surface extending in a direction from the tarmac towards the inlet at an angle to the base. The suppressor prevents formation of the vortex.

20 Claims, 9 Drawing Sheets

APPARATUS AND METHOD FOR PREVENTING INLET VORTEX

BACKGROUND OF INVENTION

This invention relates to an apparatus and a method for preventing an inlet vortex. Specifically, this invention relates to an apparatus and method for preventing the formation of a vortex at an inlet of a gas turbine engine while the engine operates on an aircraft located on a tarmac.

Technicians have several options when performing tests with in-service engines. For example, the technician can perform the engine testing on a test stand. Or the technician can perform the engine testing while the engine operates on the aircraft static on the ground. Each testing method has benefits and drawbacks.

Testing an engine in a test stand generally allows for the greatest amount of data acquisition. The test stand can measure the thrust of the engine and includes all of the instrumentation necessary to collect and to interpret engine conditions during operation. The test stand also provides a uniform standard for ensuring that each engine meets all of the flight acceptance requirements established by the certifying authority.

The drawback, however, of a test cell is that the engine must be removed from the aircraft. Removing the engine from the aircraft adds cost and time to the testing procedure.

Testing an engine while the aircraft operates statically on the ground is faster and does not include the expense of engine removal. Such testing does have drawbacks. The main drawback of typical engine installations is the limited power settings available during the test. The technician can only operate typical engine installations at low power settings.

At elevated power settings, operating the engine while the aircraft remains static on the ground can produce vortices between the tarmac and the engine inlet. The vortices can damage the engine by inducing a compressor surge, by creating unstable operating conditions, or by picking up debris.

The present invention increases the range of power settings allowed by the testing of the engine while the aircraft remains static on the ground. Preferably, the present invention expands the range of power settings such that the engine can operate at any power setting while the aircraft remains static on the ground. In other words, the present invention even allows the engine to operate at full power while the aircraft remains static on the ground.

SUMMARY OF INVENTION

It is an object of the present invention to provide an apparatus and method for assisting the testing of a gas turbine engine.

It is a further object of the present invention to provide an apparatus and method for preventing the formation of a ground plane induced inlet vortex during engine testing.

It is a further object of the present invention to expand the range of power settings allowed by the testing of an engine while the aircraft remains static on the ground.

It is a further object of the present invention to allow an engine to operate at any power setting while the aircraft remains static on the ground.

It is a further object of the present invention to allow full power operation of an engine while the aircraft remains static on the ground.

It is a further object of the present invention to prevent compressor surge due to formation of a ground vortex during engine testing while the aircraft remains static on the ground.

It is a further object of the present invention to provide stable operating conditions during engine testing while the aircraft remains static on the ground.

It is a further object of the present invention to allow the testing of an engine at elevated power settings without the need to remove the engine from the aircraft.

It is a further object of the present invention to provide an engine test at a reduced cost.

It is a further object of the present invention to provide a more rapid engine test.

These and other objects of the present invention are achieved in one aspect by a method of operating a gas turbine engine for testing. The method includes the steps of: providing an aircraft on a tarmac, the aircraft having a gas turbine engine with an inlet; selecting a power setting for the engine that is capable of producing a vortex between the inlet and the tarmac; and inhibiting formation of the vortex.

These and other objects of the present invention are achieved in another aspect by a method of preventing vortex formation. The method includes the steps of: providing an aircraft on a tarmac, the aircraft having a gas turbine engine with an inlet; operating the engine; determining whether the operating step is likely to produce a vortex between the inlet and the tarmac; and placing an object between the tarmac and the inlet should the determining step indicate a likelihood of the vortex.

These and other objects of the present invention are achieved in another aspect by a method of operating a gas turbine engine mounted on an aircraft located on a tarmac at an elevated engine pressure ratio (EPR) greater than a threshold EPR. The method comprises the steps of: placing an object between the tarmac and the engine; and operating the engine at the elevated EPR. Without the object, operating the engine at the threshold EPR would not create an inlet vortex, but operating the engine at the elevated EPR would create the inlet vortex.

These and other objects of the present invention are achieved in another aspect by a method of performing a test. The test includes a step of operating a gas turbine engine at an engine pressure ratio that typically requires removing the engine from an aircraft located on a tarmac and placing the engine on a test stand. The improvement comprises positioning a movable object between the engine and the tarmac to allow the engine to remain on the aircraft for the test.

These and other objects of the present invention are achieved in another aspect by a suppressor for preventing a vortex between an inlet of a gas turbine engine on an aircraft and a tarmac. The suppressor comprises: a base facing said tarmac; and an inclined surface extending in a direction from said tarmac towards said inlet at an angle to said base. The suppressor prevents formation of said vortex.

BRIEF DESCRIPTION OF DRAWINGS

Other uses and advantages of the present invention will become apparent to those skilled in the art upon reference to the specification and the drawings, in which.

DETAILED DESCRIPTION

Figure 1:
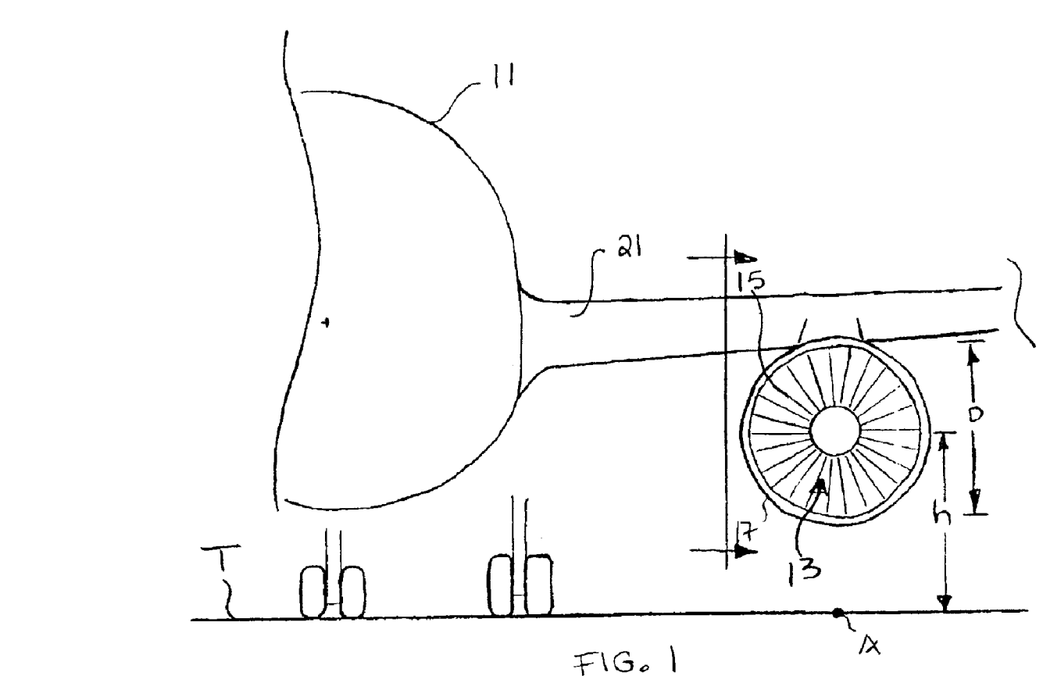
FIG. 1 is a partial front elevational view of an aircraft having a gas turbine engine and located on a tarmac.

FIG. 1 displays an aircraft 11 on a tarmac T. The aircraft 11 has one or more powerplants 13. Each powerplant 13 comprises a gas turbine engine 15 surrounded by a nacelle 17. The engine 15 could be a high bypass turbofan.

The centerline of the powerplant 13 resides at a height h above the tarmac T. The powerplant 13 could mount to the aircraft 11 in any known fashion. For example, the powerplant 13 could extend from a strut 19 below a wing 21. The nacelle 17 includes an inlet 23 that allows air to enter the engine 15. The inlet 23 has an internal throat diameter D.

Figure 2A:
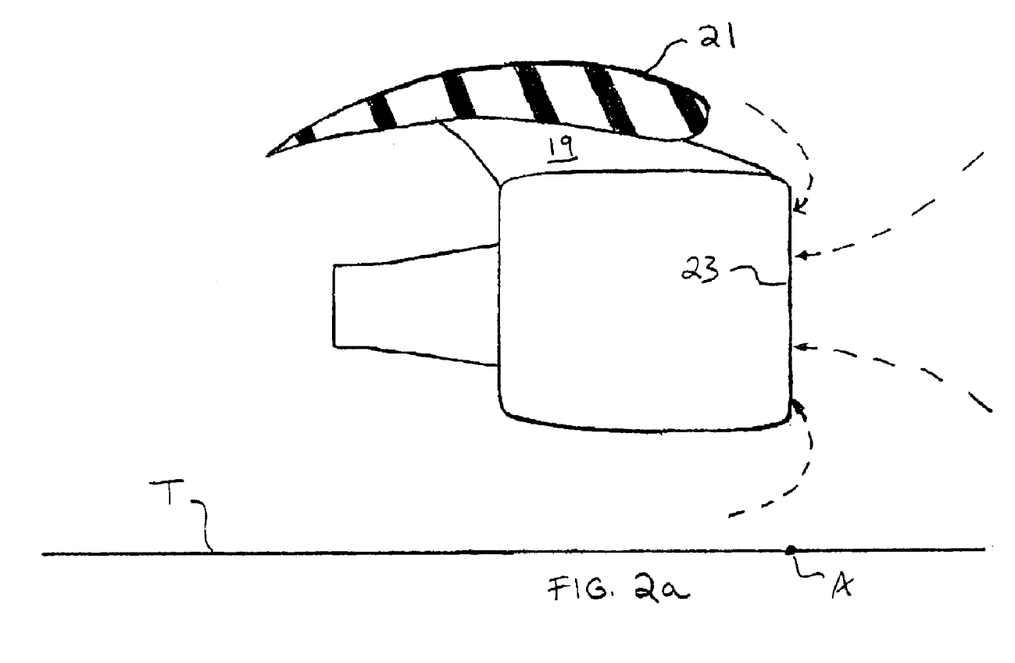
FIG. 2a is a cross-sectional view of the aircraft in FIG. 1 taken along line II—II during engine operation at a low power setting, with dashed lines showing various air flow paths entering the engine inlet.

FIG. 2a displays the powerplant 13 operating at a low power setting. The engine 15 draws in air (shown as dashed lines) from locations surrounding the inlet 23. Since the aircraft 11 remains static on the tarmac T, the engine 15 draws in air from both upstream and downstream of the inlet 23.

Engine Pressure Ratio (EPR) is a common performance parameter when discussing power settings. EPR is the ratio of the total turbine discharge pressure to the total pressure of the air entering the compressor. Although specific to each powerplant, a high bypass turbofan engine could operate at EPR values of between approximately 1.01 (idle) and 1.65 (takeoff thrust). As the power setting of the engine 15 increases, the engine 15 draws in greater amounts of air. Above a threshold power setting, a vortex V (FIG. 2b) can form between the inlet 23 of the static aircraft 11 and a point A on the tarmac T. Engines 15 located closer to the tarmac T are more prone to vortex formation than engines 15 located further from the tarmac. For example, engines 15 with a h/D value of less than approximately 2.5 tend to produce such vortices V. Engines 15 with a h/D value of greater than approximately 2.5 tend to operate without forming vortices V.

Figure 2B:
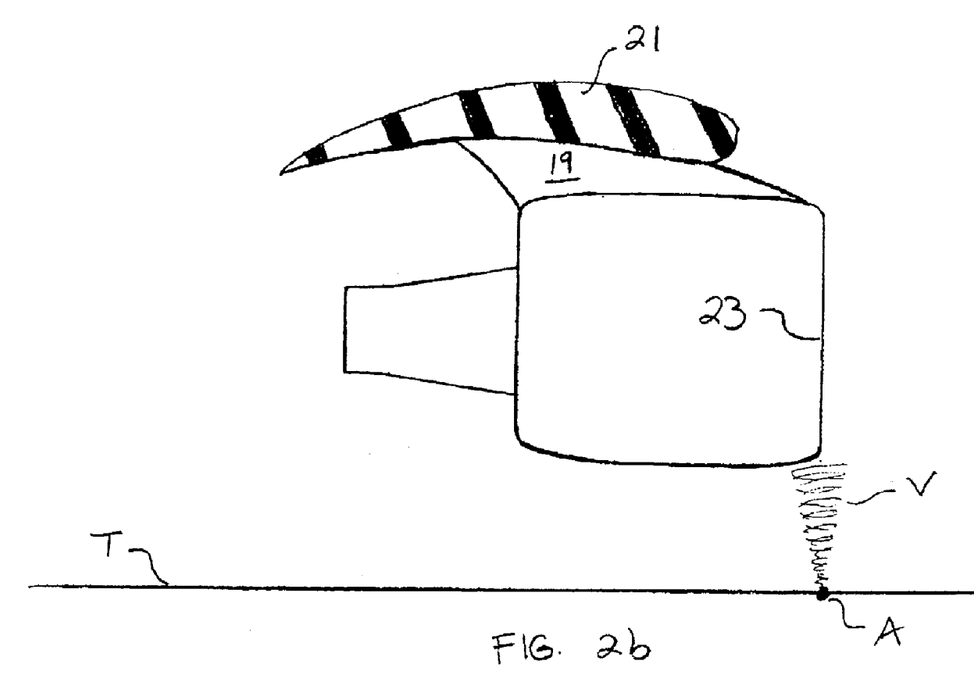
FIG. 2b is the aircraft of FIG. 2a during engine operation at an elevated power setting, where flow separation from the tarmac has created a ground vortex.
Figure 3:
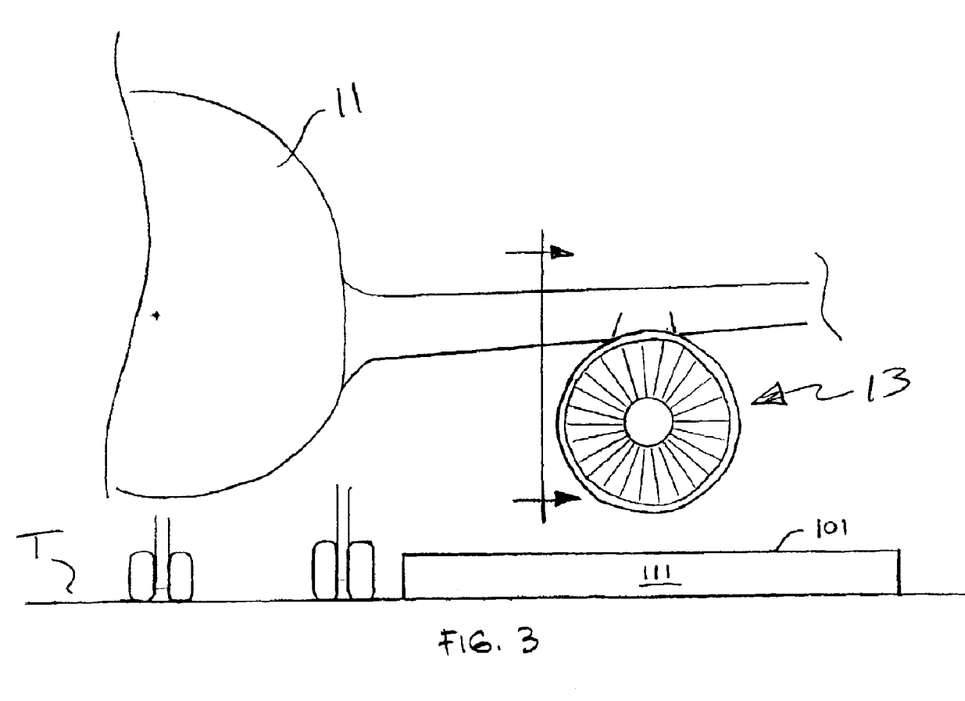
FIG. 3 is front view of one alternative embodiment of a ramp of the present invention beneath the aircraft of FIG. 1.

FIG. 2b displays the engine 115 operating at an elevated power setting. At the elevated power setting, the engine 15 produces the vortex V. The vortex V can damage the engine 15 by inducing a compressor surge, by creating unstable engine operating conditions or by picking up debris.

Conventionally, technicians avoided formation of the vortex V by testing the engine 15 only at power settings up to the threshold EPR. Testing the engine 15 an elevated EPR above the threshold EPR conventionally occurred in a test cell (not shown). In other words, conventional techniques required the technicians to remove the engine 15 from the aircraft 11 in order to perform an engine test at elevated EPRs.

Since each engine/aircraft combination has different characteristics (e.g. centerline height h above tarmac, inlet diameter D, nacelle shape, etc.), different threshold power settings may exist for each engine/aircraft combination. For example, a high bypass turbofan engine could have a threshold EPR of approximately of 1.25.

The present invention allows technicians to test the engine 15 on the aircraft 11 at elevated EPRs above the threshold EPR. For example, the present invention could allow testing of the engine 15 at an elevated EPR of at least 1.5. In fact, the present invention could even allow testing of the engine 15 at full power. As discussed earlier, a full power setting for a typical high bypass turbofan engine 15 is approximately 1.65 EPR.

The present invention allows testing at these elevated EPRs by inhibiting formation of the vortex V. FIGS. 3–6 display one embodiment of the present invention.

The present invention comprises a ramp 101 placed between the inlet 13 and the tarmac T. The ramp 101 includes a frame 103. The frame 103 could have any suitable construction, such as interconnected horizontal members 105, vertical members 107 and angled members 109. The frame 103 could be assembled in any suitable manner, such as by welding the metallic members 105, 107, 109 together.

The ramp 101 includes an inclined surface 111. The inclined surface 111 preferably extends at an angle α from the tarmac T. Preferably, the angle α is approximately 45°. However, the angle α could have any range of values that still prevent formation of the vortex V during engine operations at elevated EPRs.

Figure 4:
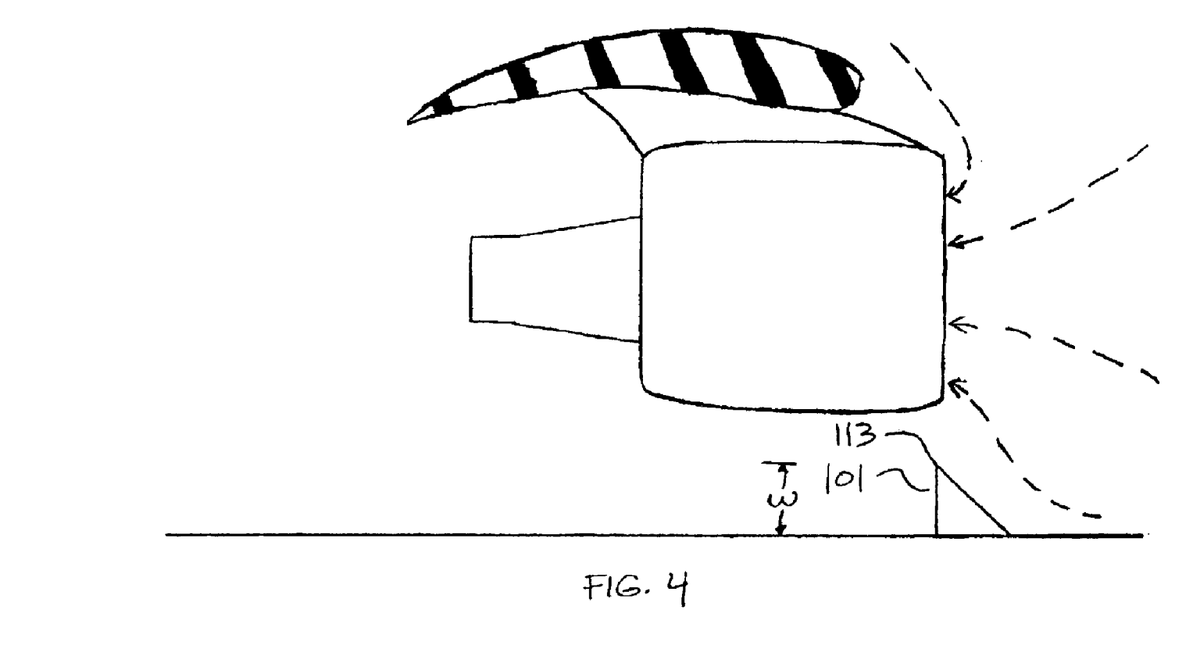
FIG. 4 is a cross-sectional view of the aircraft and the ramp of the present invention during engine operation at an elevated power setting, with dashed lines showing various air flow paths entering the engine inlet.
Figure 5:
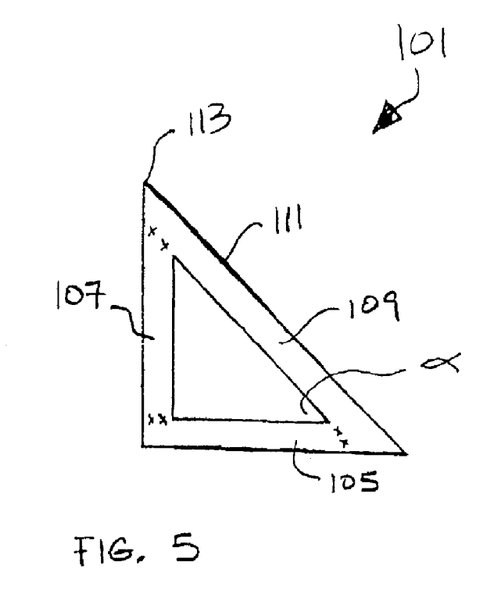
FIG. 5 is a side elevational view of the ramp in FIG. 3.
Figure 6:
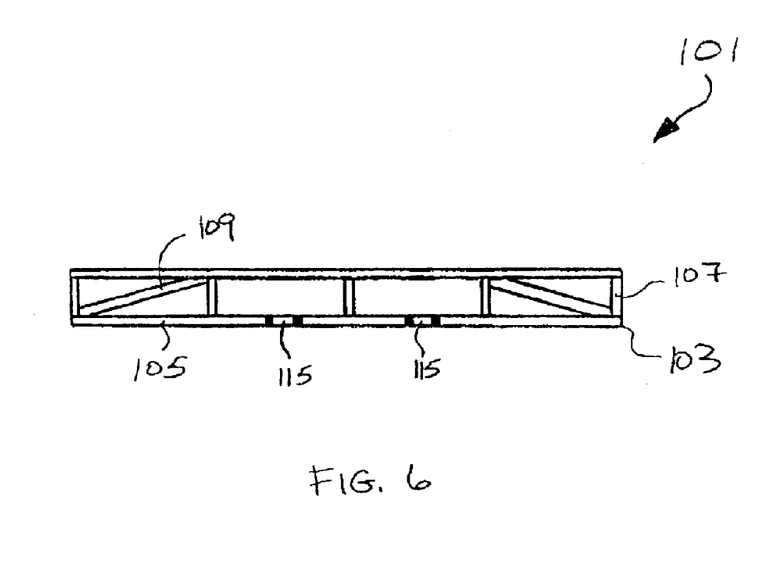
FIG. 6 is a rear elevational view of the ramp in FIG. 3.

As seen in FIG. 4, technicians place the ramp 101 on the tarmac T adjacent the nacelle 17. In such a location, the ramp 101 inhibits formation of the vortex V. The ramp 101 inhibits formation of the vortex V by facilitating the turning of the airflow near the tarmac T towards the engine 115. In other words, the ramp 101 prevents the separation of the flow from the tarmac T and prevents the formation of a stagnation point.

Figure 7:
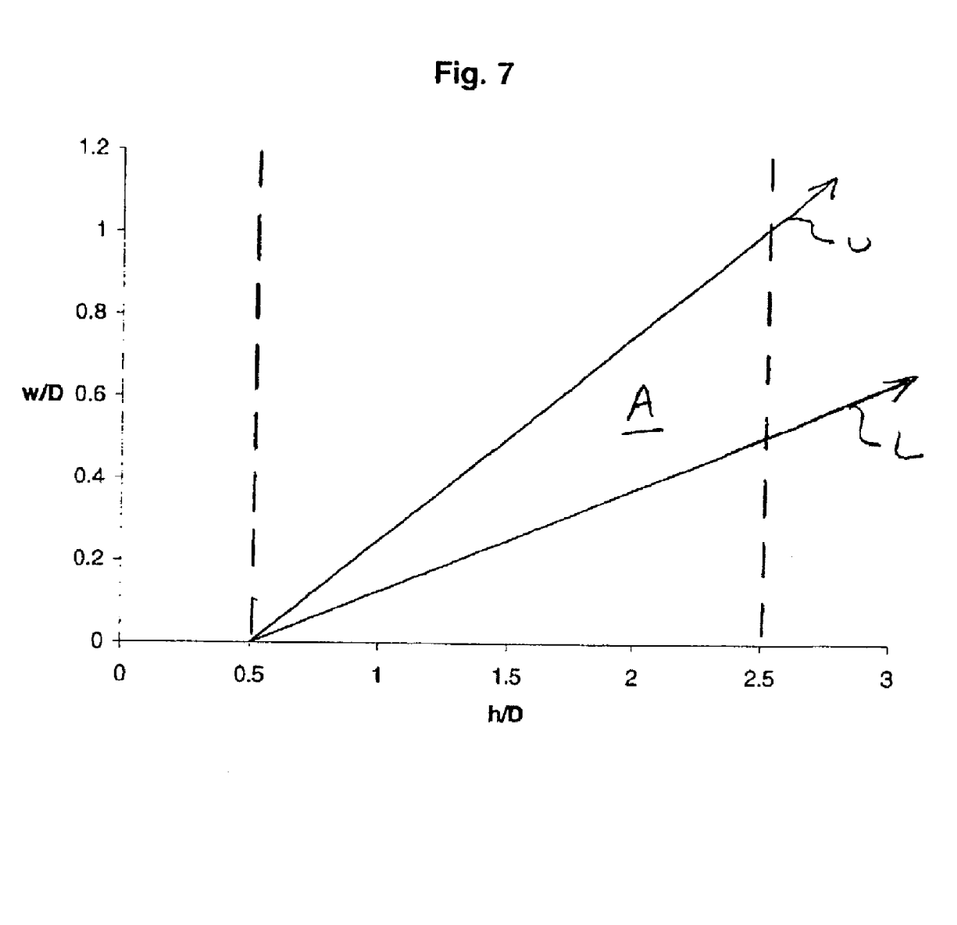
FIG. 7 is a chart of the preferred sizes for the ramp in FIG. 3.

The ramp 101 has an apex 113. Preferably, the apex 113 resides at a height w above the tarmac T. The apex 113 could have any suitable height w that inhibits formation of the vortex V. FIG. 7 displays the preferred heights for the ramp 101.

The preferred heights for the ramp 101 depend on engine geometry (namely centerline height h above the tarmac T and inlet diameter D). The figure includes an upper line U and a lower line L. The lines U, L divide the chart into three areas. The preferred height w for the ramp 101 resides in a first area A between the lines U, L. For example, FIG. 7 shows that the preferred height w for the ramp 101 used with an engine 15 having an h/D value of 1.5 can range between approximately 0.25 D and 0.5 D.

As discussed above, engines 15 with an h/D value of greater than 2.5 tend to operate without forming vortices V. The dashed line in FIG. 7 that extends from 2.5 h/D signifies where the use of the ramp 101 is no longer necessary.

The dashed line in FIG. 7 that extends from 0.5 h/D represents the lower physical limit of h/D values. An engine with a round inlet cannot have an h/D value below 0.5. At h/D values below 0.5, the engine 15 would be in contact with the tarmac T.

The other two areas of the chart reside above the upper line U and below the lower line L, respectively. Sizing a ramp 111 within these areas (ie. outside of the first area A) is not preferred since the ramp 101 may be too large or too small for the engine 15.

The chart also shows that the technicians can use a given ramp 101 on several engine/aircraft arrangements. For example, FIG. 7 shows that technicians could use a ramp 101 with a height w of 0.25 D on any engine/aircraft with an h/D value of between 1 and 1.5. This increases the versatility of the present invention.

The ramp 101 also has a length. Preferably, the length of the ramp 101 is at least 2.5 times greater than the inlet diameter D. The length could be longer in order to increase the versatility of the ramp 101. A longer ramp 101 can allow the technicians to use the ramp on engines (not shown) with larger or smaller inlet diameters D than the engine 15.

The present invention preferably positions the apex 113 of the ramp 101 directly beneath the inlet 23. However, the technician could locate the apex 113 of the ramp 101 at a position fore or aft of the inlet 23 that still prevents formation of the vortex V during engine operations at elevated EPRs. For example, the technician could position the apex 113 of the ramp 101 between approximately 1.0 w fore of the inlet and 1.0 w aft of the inlet 23.

The ramp 101 is preferably a movable structure. To assist such movement, the ramp 101 could include openings 115 at the base to receive tines (not shown) of a fork lift (not shown).

Figure 8:
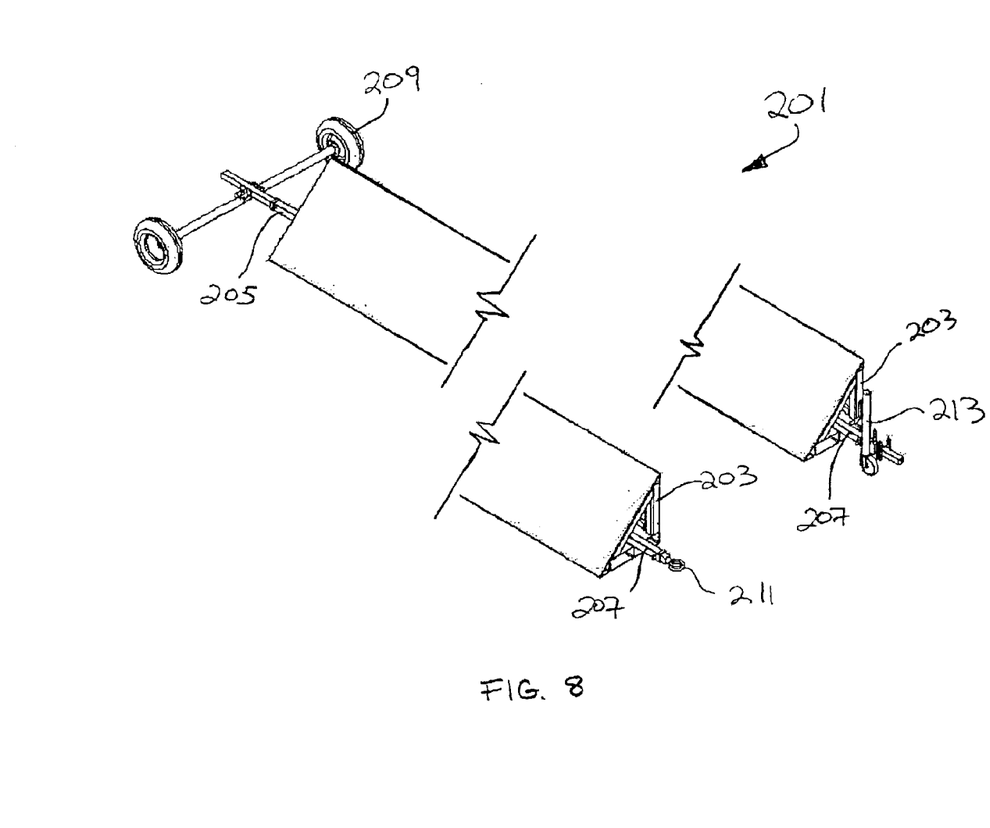
FIG. 8 is a perspective view of another alternative embodiment of a ramp of the present invention that allows easy transportation and positioning of the ramp under the test engine.

Other methods of moving the present invention are possible. FIG. 8 displays an alternative embodiment of the present invention showing several of these possibilities. Like ramp 101, this embodiment comprises a ramp 201 having a frame 203. Arms 205, 207 extend from the frame 203. The arms 205, 207 help move the ramp 201.

For example, the technician could place a floor jack (not shown) under the arm 205 and attach a wheel assembly 209 to the ramp 201 using conventional techniques. Likewise, the technician could attach a tow ring 211 or a stabilizing jack 213 to the other arm 207. With the tow ring 211 and wheel assembly 209, the technicians can use an aircraft tow tractor (not shown) to move the ramp 201. With the stabilizing jack 213 and the wheel assembly 209, the technicians can move the ramp 201 manually.

Although not shown in the figures, another alternative embodiment of the present invention is possible. For example, the ramp 301 could be formed (e.g. injection molded) with an internal chamber that receives ballast material such as water. Technicians could manually maneuver the ramp without the ballast. Once in place, the technicians add ballast to the chamber through a suitable inlet. To move the ramp, the technicians would first need to drain the ballast through a suitable outlet.

Although described with particular reference to wing-mounted powerplants 13, the present invention could used with powerplants 13 located elsewhere on the aircraft 11. For example, the technicians could use the present invention on powerplants 13 mounted to the bottom of the fuselage of the aircraft 11.

The present invention has been described in connection with the preferred embodiments of the various figures. It is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method of operating a gas turbine engine for testings comprising the steps of:

provinding an aircraft on a tarmac, said aircraft having a gas turbine engine with a centerline height (h) and an inlet having a diameter (D);

selecting a power setting for said engine that is capable of producing a vortex between said inlet and said tarmac; and placing an object between said inlet and said tarmac, said object having a height (w) ranging between approximately (2h-D)/8 and (2h-D)/4;

wherein airflow travels around said object to inhibit formation of said vortex.

2. The method of claim 1, wherein said placing step comprises removably placing said object between said inlet and said tarmac.

3. The method of claim 1, wherein said engine is located on a wing of said aircraft.

4. The method of claim 1, wherein said aircraft remains static on said tarmac while testing said engine.

5. The method of claim 1, wherein said power setting comprises up to a full power setting.

6. A method of preventing vortex formation, comprising the steps of:

providing an aircraft on a tarmac, said aircraft having a gas turbine engine with a centerline height (h) and an inlet having a diameter (D);

operating said engine;

determining whether said operating step is likely to produce a vortex between said inlet and said tarmac;

placing an object between said tarmac and said inlet should said determining step indicate a likelihood of said vortex, said object having a surface with a height (w) ranging between approximately (2h-D)/8 and (2h-D)/4; and directing airflow near said tarmac along said surface of said object towards said engine to inhibit vortex formation.

7. The method of claim 6, wherein said placing step comprises removably placing said object between said tarmac and said inlet.

8. The method of claim 6, wherein said engine is located on a wing of said aircraft.

9. The method of claim 6, wherein said operating step occurs while said aircraft remains static on said tarmac.

10. A method of operating a gas turbine engine mounted on an aircraft located on a tarmac at an elevated engine pressure ratio (EPR) greater than a threshold EPR, said engine having a centerline height (h) and an inlet with a diameter of (D), comprising the steps of:

placing an object between said tarmac and said engine to turn airflow near said tarmac towards said engine, said object having a height (w) ranging between approximately (2h-D)/8 and (2h-D)/4; and operating said engine at said elevated EPR to inhibit vorte formation.

11. The method of claim 10, wherein said placing step comprises removably placing said object between said tarmac end said engine.

12. The method of claim 10, wherein said engine is located on a wing of said aircraft.

13. The method of claim 10, wherein said operating step occurs while said aircraft remains static on said tarmac.

14. The method of claim 10, wherein said elevated EPR is up to a full power setting.

15. In a method of performing a test including a step of operating a gas turbine engine at an engine pressure ratio that typically requires removing said engine from an aircraft located on a tarmac and placing said engine on a test stand, said engine having a centerline height (h) and an inlet with a diameter (D), wherein the improvement comprises positioning a movable object with a height ranging between approximately (2h-D)/8 and (2h-D)/4 between said engine and said tarmac so that airflow travels around said object to allow said engine to remain on said aircraft for said test and to inhibit vortex formation.

16. A suppressor for preventing a vortex between an inlet of a gas turbine engine on an aircraft and a tarmac, said engine having a centerline height (h) and said inlet having a diameter(D), comprising:

a base facing said tarmac; and an inclined surface extending in a direction from said tarmac towards said inlet at an angle to said base and having a height ranging between approximately (2h-D)/8 and (2h-D)/4;

wherein airflow near said tarmac travels along said incline surface towards said inlet so that said suppressor prevents formation of said vortex.

17. The suppressor of claim 16, wherein said angle is approximately 45°.

18. The suppressor of claim 16, wherein said suppressor is portable.

19. A suppressor for preventing a vortex between an inlet of a gas turbine engine on an aircraft and a tarmac, said engine having a centerline height (h) and said inlet having a diameter (D), the suppressor:

a base; and an inclined surface extending from said base;

wherein said inclined surface has a height (w) ranging between approximately (2h-D)/8 and (2h-D)/4 to prevent formation of said vortex.

20. The suppressor of claim 19, wherein h/D is less than approximately 2.5.

* * * * *